Nov. 5, 1957  J. PENNA  2,812,423
VEHICLE WARNING LIGHT
Filed Sept. 9, 1955
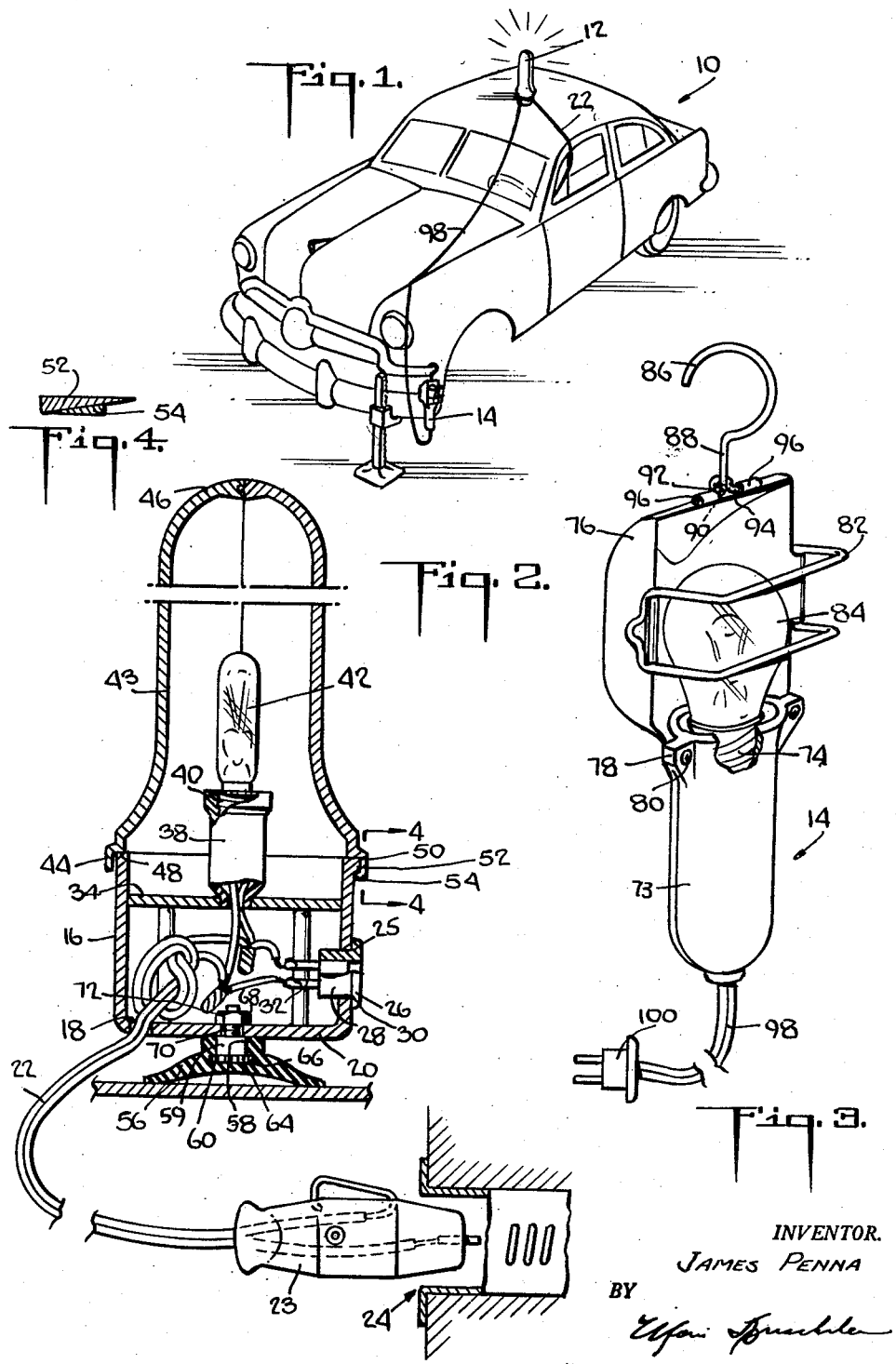
INVENTOR.
JAMES PENNA
BY
ATTORNEY

United States Patent Office 2,812,423
Patented Nov. 5, 1957

2,812,423

VEHICLE WARNING LIGHT

James Penna, Leominster, Mass.

Application September 9, 1955, Serial No. 533,448

1 Claim. (Cl. 240—8.18)

This invention relates to automobile accessories.

It is an object of the present invention to provide an automobile accessory including means for furnishing light for repairing the automobile on which it is used and means for at the same time warning other autos that the auto is stationary.

It is another object of the invention to provide a device of the character described wherein the warning means can be conveniently disposed anywhere on the car, without injuring the finish.

It is another object of the invention to provide a device of the character described wherein the warning means can be disposed near the lighting means so that excess wires and extension cords are avoided.

It is another object of the invention to provide a device of the character described wherein the lighting means is employed at the option of the user.

It is another object of the invention to provide a device of the character described which is simple to operate and may be easily detachably connected into the electrical system of the car.

It is another object of the invention to provide a device of the character described which is inexpensive and simple to manufacture, and is attractive in appearance.

It is another object of the invention to provide a device of the character described which is durable and sturdy.

Other objects of the invention in part will be obvious and in part will be pointed out hereinafter.

The invention, accordingly, consists in the features of construction, combinations of elements and arrangements of parts which will be exemplified in the device hereinafter described and of which the scope of application will be indicated in the appended claim.

In the accompanying drawings, in which is shown one of the various possible embodiments of the inventions, Fig. 1 is a perspective view of an automobile with an accessory embodying the instant invention shown in use therewith;

Fig. 2 is an enlarged longitudinal sectional view through the warning means of the accessory shown in Fig. 1, and also illustrating the connection to the automobile electrical system;

Fig. 3 is an enlarged perspective view of the lighting means of the accessory shown in Fig. 1; and Fig. 4 is an enlarged fragmentary sectional view taken along the lines 4—4 of Fig. 2.

Referring now in detail to the drawings, the reference numeral 10 denotes a car on which an auto accessory embodying the invention is disposed. The accessory comprises a warning light 12 and a trouble light 14.

The warning light includes a cup 16 fabricated for example from light sheet metal or a synthetic thermoplastic resin which, if desired, may be coated on its exterior with metal. The inside wall of the cup is similarly coated to render it specular at least near the top thereof for a reason which later will be pointed out. An opening 18 is provided in the bottom wall 20 of the cup for admitting a conventional electric cord 22. Said cord includes means to connect into the electrical system of the automobile. As illustrated, said means is a plug 23 adapted to be inserted in the cigarette lighter socket 24 of the automobile. A two-prong socket 25 is located with its face 26 on the outside of the cup and its shank 28 projecting into the cup through an opening 30 in the side wall of the cup. The face of the socket is larger than the shank and the opening, so that it is seated against the outside wall of the cup. The socket contacts are connected by solder terminals 32 to the electric cord.

A disc 34 fabricated for example from sheet metal or a thermoplastic, the upper surface whereof preferably is spray-coated with metal to render it specular, is force-fitted into the cup a short distance.

A husk 38 fabricated from the thermoplastic is permanently secured at the center of the top surface of the disc as by cement. A light bulb socket 40 having a serrated outturned flanged extending from a screw-thread cylindrical side wall is force-fitted into the husk. The socket wall is made of electrically conductive material. An electrically non-conductive washer covers the open bottom of the socket, said washer having an electrical contact located in the center thereof. The wall and center contacts are connected to the electric cord 22 in parallel with the socket 25 so that either may be operated without the other.

An incandescent flasher bulb 42 is screwed into the socket 40. The specular upper internal surface of the cup and the specular top surface of the disc constitute a reflector for the bulb whereby to furnish a brilliant source of light. A pellucid, elongated beacon shell 43 having a flared bottom 44 and a rounded top 46 fits over the top of the cup. The bottom of the shell includes an internal step 48 and a depending peripheral flange 50 spaced outwardly therefrom. Said shell is preferably fabricated from a synthetic thermoplastic resin. It is made in two sections, as clearly seen in Fig. 2. One section is colored red to give a warning of approaching danger to an oncoming motorist. The other is colored yellow to caution cars coming in the opposite direction.

To provide access to the flasher bulb the shell is detachably secured to the cup as by lugs 52 disposed on the outside of the cup and cams 54 located inside the flange of the shell. The lugs slant upwardly in a counter-clockwise direction while the cams slant downwardly in a clockwise direction. The highest point on the cams is closer to the step than the thickness of the lug at its thickest point. Thus, when the flange of the shell is fitted over the top of the cup and rotated clockwise (or the lugs rotated counterclockwise) the lug and cam catch and lock the shell and cup together. To unlock the shell and cup, one or both of them need merely to be rotated in the opposite direction (see Figs. 2 and 4).

Pursuant to the invention, means is provided on the warning light to detachably secure the same to the automobile. Said means comprises a soft elastomeric suction cup 56 having a mushroom cavity 58 at its back. The suction cup it attached to the bottom of the cup 16 as by a bolt 59 having a head 60 which is forced into the cavity. The head is provided with serrations 64 which are received in corresponding ribs 66 in the suction cup. This prevents turning of the cup on the bolt. The threaded shank 68 of the bolt is received in an opening 70 in the bottom of the cup 16, the bolt and suction cup being secured throughout by a nut 72 screwed onto the bolt inside the cup 16.

The trouble light 14 comprises a husk 73 including a conventional light bulb socket 74. A trough-shaped reflector 76 is attached to ears 78 at the top of the husk as by rivets 80. A wire guard 82 is provided to protect a light bulb 84 disposed in the socket. The guard is pivoted on the reflector to permit replacement of the bulb.

A hook 86 is swivelled on the top of the reflector so that the trouble light may be suspended conveniently on the car when it is needed. To accomplish this, the tip of the hook shaft 88 is provided with a head 90. The shaft is captively rotatably received in a loop 92 formed of a length 94 of wire that is rotatable in aligned sleeves 96 at the top of the reflector. Thus the hook can be rotated about the longitudinal axis of its shaft as well as about the longitudinal axis of the wire 94 at right angles to the shaft. The ensuing freedom of movement facilitates placement of the trouble light wherever it is needed as there will almost always be available a suitable object from which the hook can be hung.

A conventional electric cord 98 is attached to the socket 74. Said cord includes a two-prong plug 100 adapted to be received in the socket 25 of the warning light. Thus the trouble light may, at the option of the user, be connected to the warning light.

To use the device, the energizing plug 23 is inserted in the socket 24 and the cup 56 is applied to an appropriate spot on the car. Preferably, it is placed at a high point, as on the roof of the car, so that maximum visibility thereof is afforded. However, if, for example, the car is pulled off the road and is under a low tree, it may be desirable to locate the device on a window or fender near the road. The suction cup provides great flexibility in this regard and allows the device to be appropriately disposed so as to meet the exigencies of any situation. The casing 43 is so oriented that the red side faces oncoming traffic on the side of the road on which the disabled car is parked. Thus the yellow, i. e., caution signal faces in the opposite direction to warn cars to approach cautiously. Intermittent energization of the bulb 42 lends emphasis to the danger and caution warnings afforded by the device. Moreover, the specular exterior of the cup 16 reflects light from the sun in daytime and from the beams of moving cars at night so additional signals are furnished which, due to movement of the cars, are intermittent and provide extra safety for the disabled car, its passengers and its driver.

Without any inconvenience, the warning light 12 readily can be placed on a part of the car reasonably near the repair that is to be made. In this manner the socket 25 is close enough to the point where a working light must be provided for the cord 98 of the working light to be connected thereto, thus avoiding the use of plural extension cords on the side of the car where some one will be working and minimizing the chance that the repairman or driver will trip over the cord and stumble into the path of a speeding car.

It thus will be seen that there is provided a device which achieves all the objects of the invention and is well adapted to meet the conditions of practical use.

As various possible embodiments might be made of the above invention and as various changes might be made in the embodiments above set forth, it is to be understood that all matter herein described and shown in the accompanying drawings is to be interpreted as illustrative and not in a limiting sense.

Having thus described the invention, there is claimed as new and desired to be secured by Letters Patent:

An automobile accessory including a warning light comprising a cup, a disc detachably secured in the cup, the disc and cup having their exposed surfaces specular, a husk affixed to the top of the disc, a socket secured in the husk, a bulb disposed in the socket, a pellucid, elongated, tubular beacon shell disposed over the bulb and detachably secured to the cup, an electric cord having one end received in the cup through an opening therein, said end being connected to the socket, the other end of said cord having disposed thereon a plug adapted to be inserted into a socket of the electrical circuit of an automobile, a suction cup secured at the bottom of the first-mentioned cup whereby the warning light may be easily detachably secured to a surface on an automobile, and a plug receptacle located in the wall of the first-mentioned cup and electrically connected in parallel with the circuit of the bulb, whereby another electrical appliance may be conveniently connected to the warning light.

References Cited in the file of this patent

UNITED STATES PATENTS

| | | |
|---|---|---|
| Re. 16,254 | Leech et al. | Jan. 19, 1926 |
| 2,496,618 | Cox et al. | Feb. 7, 1950 |
| 2,567,687 | Benander | Sept. 11, 1951 |
| 2,675,545 | Wolper | Apr. 13, 1954 |

FOREIGN PATENTS

| | | |
|---|---|---|
| 660,801 | France | July 17, 1929 |